(12) United States Patent
Anghel et al.

(10) Patent No.: US 9,045,996 B2
(45) Date of Patent: Jun. 2, 2015

(54) GAS TURBINE ENGINE OPTIMIZATION BY ELECTRIC POWER TRANSFER

(71) Applicant: HONEYWELL INTERNATIONAL INC., Morristown, NJ (US)

(72) Inventors: Cristian Anghel, Oro Valley, AZ (US); Wayne Pearson, Oro Valley, AZ (US); Jens Gehrke, Rancho Palos Verdes, CA (US); Kevin Condon, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 200 days.

(21) Appl. No.: 13/681,656

(22) Filed: Nov. 20, 2012

(65) Prior Publication Data

US 2014/0245748 A1 Sep. 4, 2014

(51) Int. Cl.
| | |
|---|---|
| *F01D 15/10* | (2006.01) |
| *F02C 7/36* | (2006.01) |
| *F02C 7/32* | (2006.01) |
| *F02C 9/00* | (2006.01) |
| *F02C 7/268* | (2006.01) |

(52) U.S. Cl.
CPC ............... *F01D 15/10* (2013.01); *F02C 7/268* (2013.01); *F05B 2220/706* (2013.01); *F02C 7/36* (2013.01); *F02C 7/32* (2013.01); *F02C 9/00* (2013.01); *F05D 2240/40* (2013.01); *F05D 2220/32* (2013.01)

(58) Field of Classification Search
CPC ............ F02C 7/268; F02C 7/275; F02C 7/32; F02C 9/56; F02C 7/262; F02C 7/36; F02C 9/00; F01D 15/10; F05B 2220/706; F05D 2240/32; F05D 2240/40
USPC ............. 60/39.163, 268, 773, 786, 801, 802, 60/803, 792, 787, 788
See application file for complete search history.

(56) References Cited

U.S. PATENT DOCUMENTS

| | | | |
|---|---|---|---|
| 3,930,366 A | 1/1976 | Nelson | |
| 4,466,526 A | 8/1984 | Howlett et al. | |
| 4,743,777 A | 5/1988 | Shilling et al. | |
| 5,694,765 A * | 12/1997 | Hield et al. ................. | 60/39.163 |
| 5,867,979 A | 2/1999 | Newton et al. | |

(Continued)

OTHER PUBLICATIONS

USPTO Office Action U.S. Appl. No. 13/324,789, Notification Date Aug. 28, 2013.

*Primary Examiner* — Phutthiwat Wongwian
*Assistant Examiner* — Alain Chau
(74) *Attorney, Agent, or Firm* — Ingrassia Fisher & Lorenz, P.C.

(57) ABSTRACT

A method of increasing the operational efficiency of an operating gas turbine engine includes supplying mechanical power from a first spool of the operating gas turbine engine to a first electrical machine to thereby generate electrical power using the first electrical machine and supplying mechanical power from a second spool of the operating gas turbine engine to a second electrical machine to thereby generate electrical power using the second electrical machine. The method further includes sensing one or more operational parameters of the operating gas turbine engine and, based on the one or more sensed operational parameters, ceasing to generate electrical power using the second electrical machine, and instead supplying at least a part of the electrical power generated by the first electrical machine to the second electrical machine to operate in motoring mode and to thereby generate and supply mechanical output power to the second spool of the engine.

18 Claims, 13 Drawing Sheets

(56) References Cited

U.S. PATENT DOCUMENTS

| | | |
|---|---|---|
| 6,895,741 B2 | 5/2005 | Rago et al. |
| 7,468,561 B2 * | 12/2008 | Kern et al. ................. 290/4 A |
| 7,513,120 B2 * | 4/2009 | Kupratis ........................ 60/791 |
| 7,552,582 B2 * | 6/2009 | Eick et al. ................. 60/39.163 |
| 7,690,186 B2 * | 4/2010 | Dooley ..................... 60/39.511 |
| 7,802,757 B2 | 9/2010 | Dooley et al. |
| 7,852,646 B2 | 12/2010 | Rajne et al. |
| 7,854,582 B2 * | 12/2010 | Ullyott .............................. 415/1 |
| 7,861,533 B2 * | 1/2011 | Dooley ........................... 60/778 |
| 7,973,422 B2 | 7/2011 | Colin et al. |
| 7,975,465 B2 | 7/2011 | Morris et al. |
| 8,099,944 B2 | 1/2012 | Foster et al. |
| 8,146,370 B2 | 4/2012 | Zeiner et al. |
| 8,161,728 B2 | 4/2012 | Kupratis |
| 2006/0042252 A1 * | 3/2006 | Derouineau ................... 60/703 |
| 2008/0149445 A1 | 6/2008 | Kern et al. |
| 2009/0091133 A1 | 4/2009 | Baker et al. |
| 2010/0058731 A1 | 3/2010 | Haehner et al. |
| 2010/0115957 A1 | 5/2010 | Labala |
| 2010/0251726 A1 | 10/2010 | Jones et al. |
| 2010/0253294 A1 | 10/2010 | Maddali et al. |
| 2011/0101693 A1 | 5/2011 | Goi et al. |
| 2012/0000204 A1 | 1/2012 | Kesseli et al. |
| 2012/0017602 A1 * | 1/2012 | Hansen et al. ................. 60/778 |
| 2012/0180498 A1 | 7/2012 | Francisco |

* cited by examiner

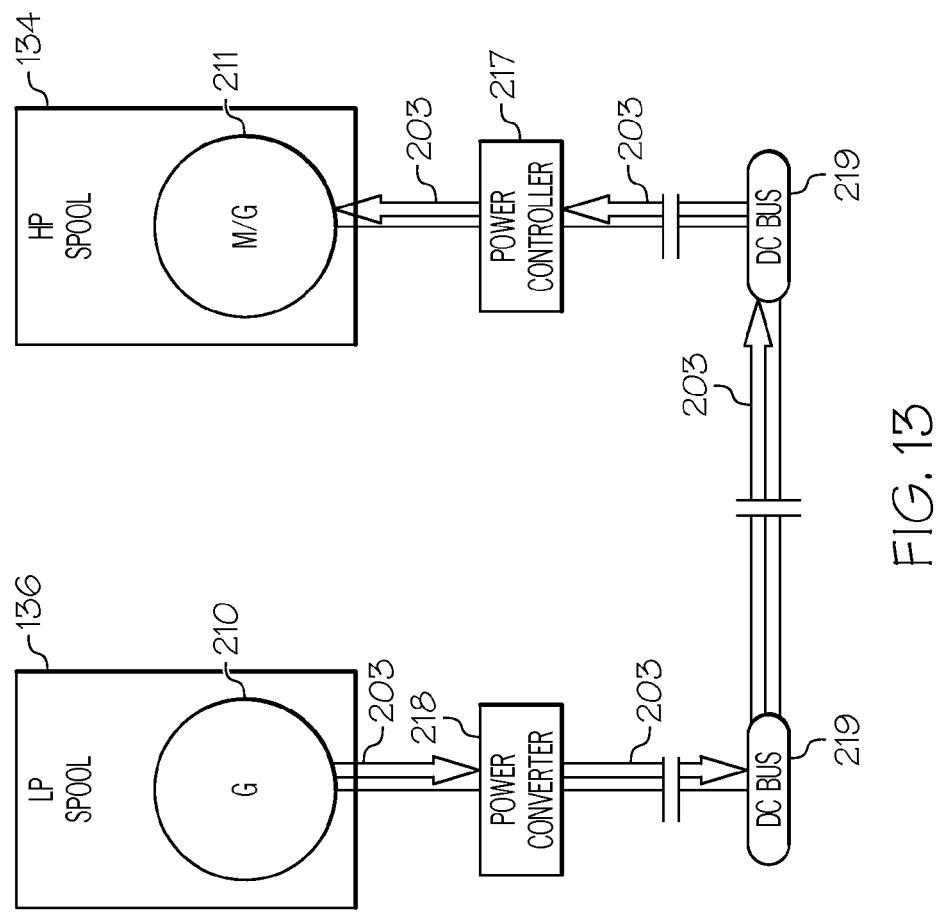
FIG. 13
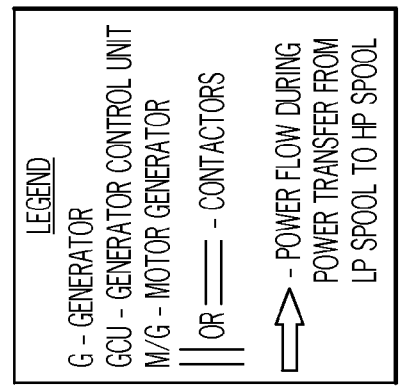

GAS TURBINE ENGINE OPTIMIZATION BY ELECTRIC POWER TRANSFER

TECHNICAL FIELD

The present invention generally relates to gas turbine engines, and more particularly relates to a system and a method for optimizing the operation of a gas turbine engine by electric power transfer.

BACKGROUND

A gas turbine engine may be used to supply power to various types of vehicles and systems. For example, gas turbine engines may be used to supply propulsion thrust or power for various types of vehicles, including aircraft and helicopters. Also, a gas turbine engine may be used as an auxiliary power unit (APU) to provide electrical power or compressed air to an aircraft. Generally, gas turbine engines include at least three major sections: a compressor section, a combustor section, and a turbine section. The compressor section receives a flow of intake air and raises the pressure of this air to a relatively high level. The compressed air from the compressor section then enters the combustor section, where fuel nozzles inject a steady stream of fuel. The injected fuel is ignited by a burner, which significantly increases the temperature of the compressed air. The high-temperature compressed air from the combustor section then flows into and through the turbine section, causing rotationally mounted turbine blades to rotate and generate power. The air exiting the turbine section is then exhausted from the engine. In a multi-spool engine, the turbine section may include a plurality of turbines. The mechanical power generated in each of the turbines may be used to rotate other portions of the engine, such as a generator to produce electrical power, as well as providing propulsive thrust.

Typically, gas turbine engines are configured so as to operate most efficiently during "cruise" operations, that is, at engine speeds typically used during the cruise portion of the vehicle operation. While gas turbine engines are optimized for cruise, during certain flight phases, such as take-off and descent, and other transient operations, the engine may operate in a sub-optimal condition. Sub-optimal operation increases fuel burn, and therefore leads to an increased expense of operation.

Hence, there is a need for a system and a method that alleviates the above-noted deficiencies in the prior art. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In one embodiment, a method of increasing the operational efficiency of an operating gas turbine engine includes supplying mechanical power from a first spool of the operating gas turbine engine to a first electrical machine to thereby generate electrical power using the first electrical machine and supplying mechanical power from a second spool of the operating gas turbine engine to a second electrical machine to thereby generate electrical power using the second electrical machine. The method further includes sensing one or more operational parameters of the operating gas turbine engine and, based on the one or more sensed operational parameters, ceasing to generate electrical power using the second electrical machine, and instead supplying at least a part of the electrical power generated by the first electrical machine to the second electrical machine to operate as a motor and to thereby generate and supply mechanical output power to the second spool of the operating gas turbine engine.

In another embodiment, a system for increasing the operational efficiency of an operating gas turbine engine includes a first electrical machine associated with a first spool of the operating gas turbine engine. The first spool is configured to supply mechanical power to the first electrical machine to thereby generate electrical power. The system further includes a second electrical machine associated with a second spool of the operating gas turbine engine and a power controller associated with the second electrical machine. The power controller is configured to selectively change the configuration of the second electrical machine from a first configuration to a second configuration. In the first configuration the second electrical machine is configured to receive mechanical power from the second spool to thereby generate electrical power. In the second configuration the second electrical machine is configured operate as a motor and to generate and supply mechanical output power to the second spool. Further, in the second configuration, at least a part of the electrical power generated by the first electrical machine is transferred to the second electrical machine to generate and supply mechanical output power to the second spool.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figure, wherein like numerals denote like elements, and wherein:

FIGS. 2-13 depict simplified schematic representations of exemplary turbofan gas turbine engine control systems.

DETAILED DESCRIPTION

Figure 1:
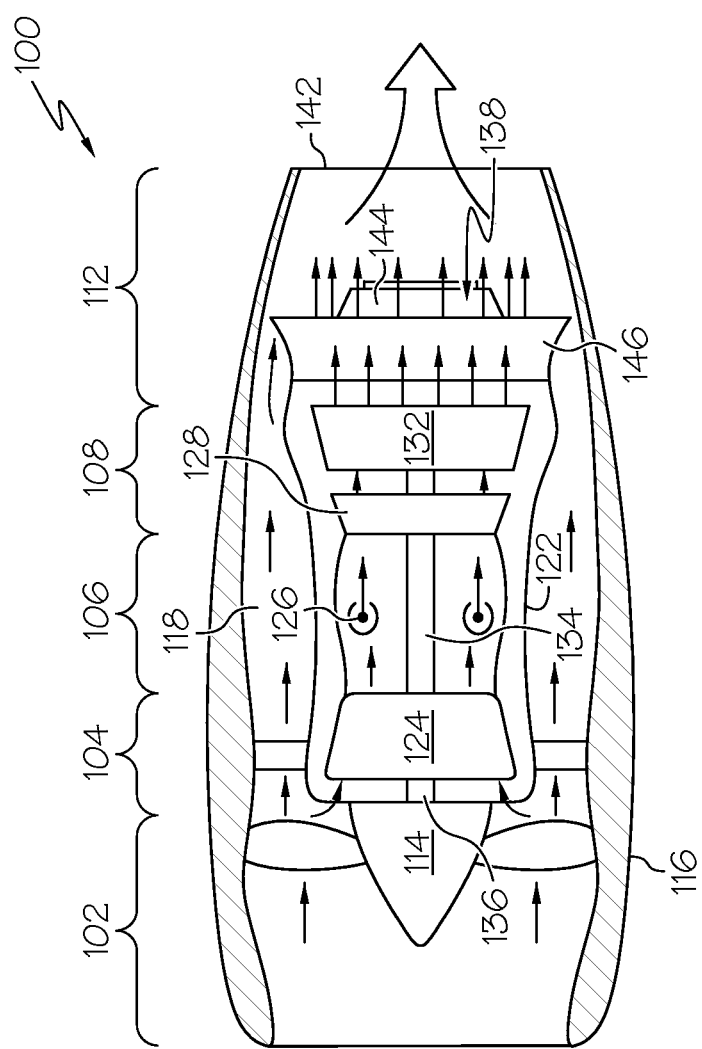
FIG. 1 depicts a functional block diagram of an embodiment of a turbofan gas turbine engine.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this regard, although the following description is directed to an aircraft turbofan gas turbine propulsion engine, it will be appreciated that numerous gas turbine engine configurations and implementations may be used. For example, the gas turbine engine could be used to drive one or more rotors of a helicopter, the gas turbine engine may be implemented as an APU, or the gas turbine engine may be used to supply power to any one of numerous other types of waterborne, airborne, or terrestrial vehicles.

Broadly speaking, propulsion engines, such as gas turbine engines, for aircraft and other vehicles generate propulsion thrust via an integral fan, propeller, or rotor. Such engines are used to drive other mechanical loads such as generators and pumps, and provide compressed air. Typically, multi-spool turbofan gas turbine engines are used. Taking the example of a two-spool turbofan, the fan on the intake draws in air, accelerates it, and produces thrust. For example, with a fan bypass ratio of 4.0, 80% bypasses the high pressure (HP) core and produces thrust; the other 20% goes through the HP core. The HP compressor raises the pressure of this air and directs it to the combustor, which generates high energy combusted gas. This gas is directed into the turbine section, consisting of the HP turbine and Low Pressure (LP) turbine sections. The turbines drive the equipment in the engine using concentric shafts (spools). The HP turbine drives the HP compressor via the HP spool and the LP turbine drives the fan via the LP spool. Additional equipment such as generators and pumps are also driven by the two spools. As noted above, the engine configuration is optimized for cruise, but during certain flight phases, such as take-off and descent, it operates in a suboptimal condition, thereby increasing fuel burn.

In accordance with an embodiment of the present disclosure, the two spools (in this example) of the turbofan gas turbine engine can be operated closer to their optimum design point, while increasing the thrust during the take-off and decreasing it during descent by electrically transferring power from one spool to another. Prior control schemes known in the art attempted to optimize performance by varying the electrical loads on the two spools. Embodiments of the present disclosure as described herein allow for energy to be transferred between engine spools as needed to further optimize and enhance performance. This novel configuration will (1) reduce the fuel burn during these off-optimum conditions, (2) reduce the effects of large load transients, and (3) augment the power available from the engine.

Turning now to FIG. 1, a functional block diagram of an exemplary turbofan gas turbine engine 100 is depicted. The depicted engine is a multi-spool turbofan gas turbine propulsion engine, and includes an intake section 102, a compressor section 104, a combustion section 106, a turbine section 108, and an exhaust section 112. The intake section 102 includes an intake fan 114, which is mounted in a nacelle assembly 116. The intake fan 114 draws air into the intake section 102 and accelerates it. A fraction of the accelerated air exhausted from the intake fan 114 is directed through a bypass flow passage 118 defined between the nacelle assembly 116 and an engine cowl 122. This fraction of air flow is referred to herein as bypass air flow. The remaining fraction of air exhausted from the intake fan 114 is directed into the compressor section 104.

The compressor section 104 may include one or more compressors 124, which raise the pressure of the air directed into it from the intake fan 114, and direct the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel supplied from a non-illustrated fuel source. The fuel and air mixture is combusted, and the high energy combusted fuel/air mixture is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the engine could be configured with more or less than this number of turbines. No matter the particular number, the combusted fuel/air mixture from the combustion section 106 expands through each turbine 128, 132, causing it to rotate. As the turbines 128 and 132 rotate, each drives equipment in the engine via concentrically disposed shafts or spools. Specifically, the high pressure turbine 128 drives the compressor 124 via a high pressure spool 134, and the low pressure turbine 132 drives the intake fan 114 via a low pressure spool 136. The gas exhausted from the turbine section 108 is then directed into the exhaust section 112.

The exhaust section 112 includes a mixer 138 and an exhaust nozzle 142. The mixer 138 includes a center-body 144 and a mixer nozzle 146, and is configured to mix the bypass air flow with the exhaust gas from the turbine section 108. The bypass air/exhaust gas mixture is then expanded through the exhaust nozzle 142, providing forward thrust.

Broadly speaking, and as noted above, in an embodiment, the two spools 134, 136 of the turbofan gas turbine engine can be operated closer to their optimum design point, while increasing the thrust during the take-off and decreasing it during descent, by electrically transferring power from one spool to another. Broadly speaking, in an embodiment, there is at least one electrical machine coupled to the low pressure (LP) spool and at least one electrical machine coupled to the high pressure (HP) spool. The electrical machine on the HP spool has an associated power controller. Power is transferred by electrical means from the LP spool to the HP spool. In this regard, the electrical machine on the LP spool is operated as a generator. The generated power is supplied to the power controller that in turn supplies the HP electrical machine. The controller drives the HP electrical machine as a motor and adds mechanical power to the HP spool. This way mechanical power is transferred from the LP spool to the HP spool by electrical means. The HP electrical machine may also operate as a generator, and thereby supply electricity to the aircraft as needed.

In accordance with the above description, FIGS. 2-13 present simplified schematic representations of exemplary embodiments of turbofan gas turbine engine power transfer control systems that allow for energy to be transferred between the engine spools 134, 136 as needed to further optimize and enhance performance. In one embodiment, referring now particularly to FIG. 2, mechanically coupled with the LP spool 136 is a generator 210, such as a wound field generator, which generates electrical power in the form of an alternating current (AC) when the LP spool 136 rotates. The AC produced by generator 210 is directed to a rectifier 216, which converts the AC into direct current (DC). The DC is used to power a generator control unit (GCU) 215 associated with the generator 210 of the LP spool 136 to control the operation of such generator 210. The DC power is also directed to the aircraft DC bus 219.

In this embodiment, mechanically coupled with the HP spool 134 is a motor/generator 211, which is configured to alternatively generate electrical power as a generator or receive electrical power and produce mechanical energy as a motor. When operating as a generator, for example in the manner of a wound field generator, the motor/generator 211 generates electrical power in the form of AC when the HP spool 134 rotates. The AC produced by motor/generator 211 in the generator mode is directed to a rectifier 216, which converts the AC into DC. As with the LP spool 136, a GCU 215 is provided to control the operation of motor/generator 211, and operates with DC. Further, the motor/generator on the HP spool 134 has an associated power controller 217, which is a uni-directional power controller. Operation of the HP spool motor/generator 211 can be performed in one of the following modes: (1) as a starter. In this mode, the uni-directional power controller supplied DC power from the aircraft bus 219 to the motor/generator 211 and the motor/generator 211 produces torque to start the engine. (2) as a generator. In this mode, the motor/generator 211 generates AC power (converted to DC by rectifier 216), and is supplied to the aircraft DC bus 219. (3) as a motor. In this mode, the uni-directional power controller supplies DC power to the motor/generator 211, and the motor/generator 211 produces torque that is added to the torque produced by the HP spool 134.

Figure 2:
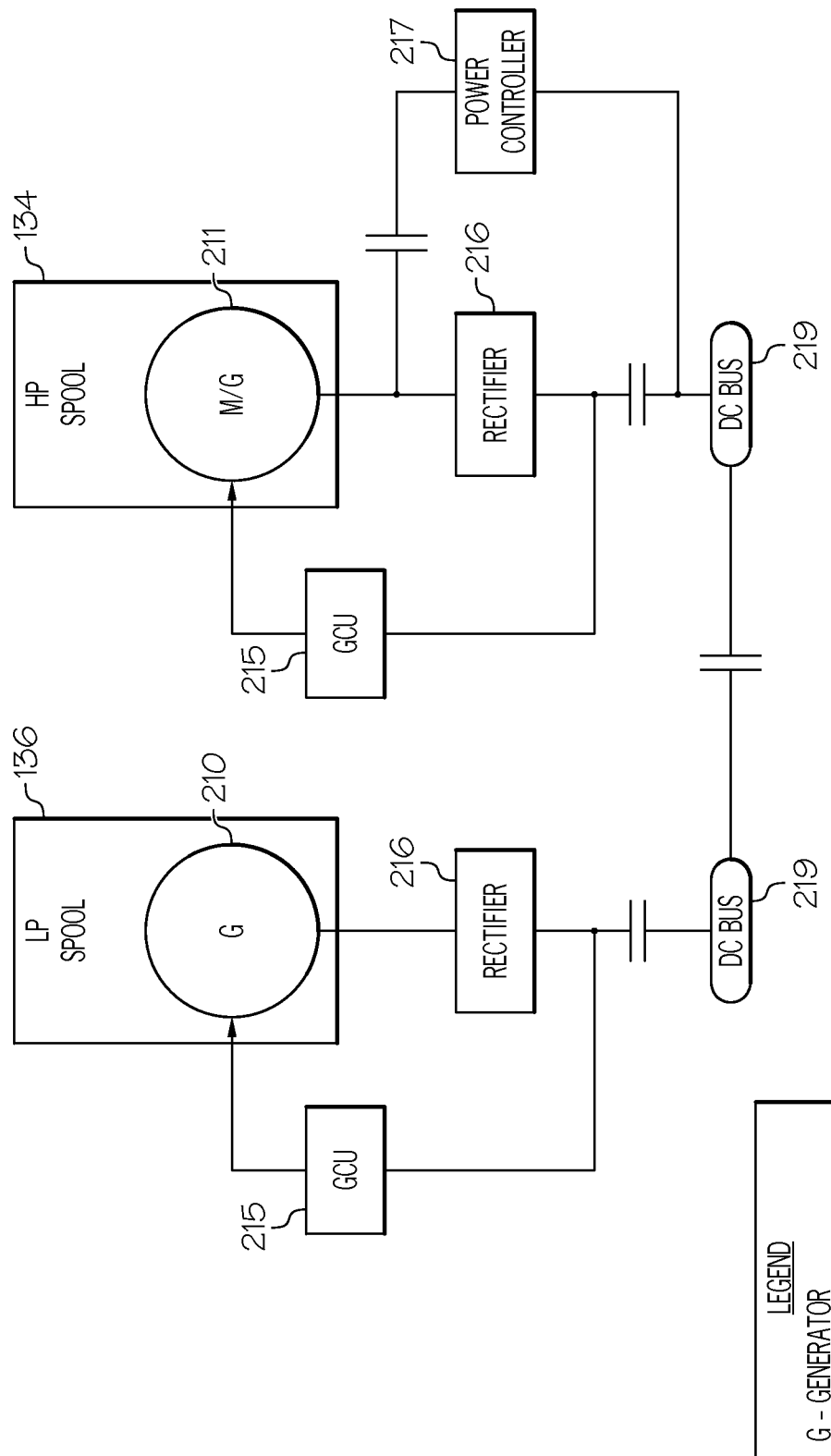
Figure 3:
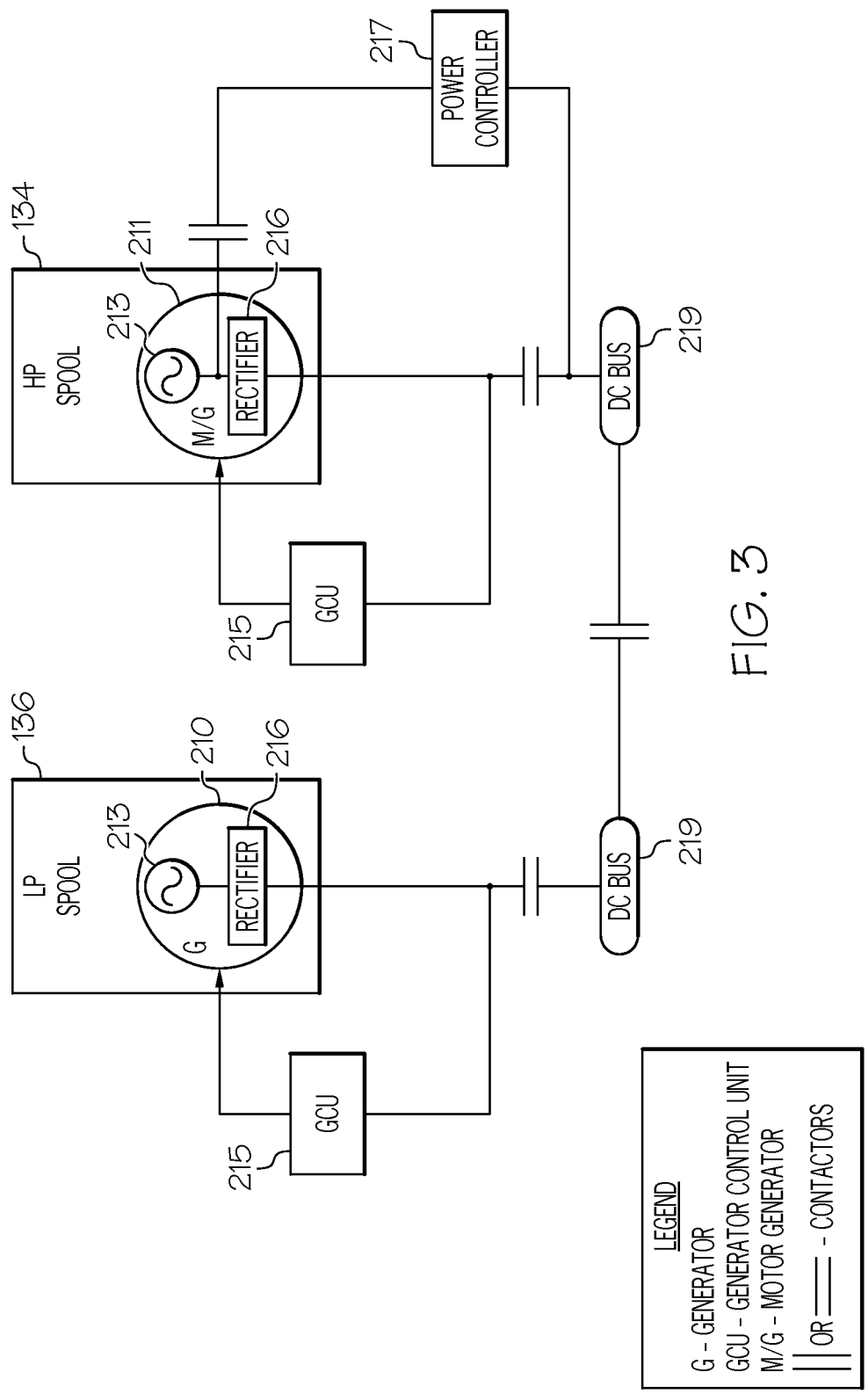

In another embodiment, referring now particularly to FIG. 3, an alternative embodiment is illustrated wherein the rectifiers 216 are integrated within the generator 210 and the motor/generator 211. As such, AC power 213 generated within electrical machines 210, 211 is converted to DC by an integrated rectifier 216. In other respects, the control system illustrated in FIG. 3 operates in a manner analogous to the control system described above with regard to FIG. 2.

Figure 4:
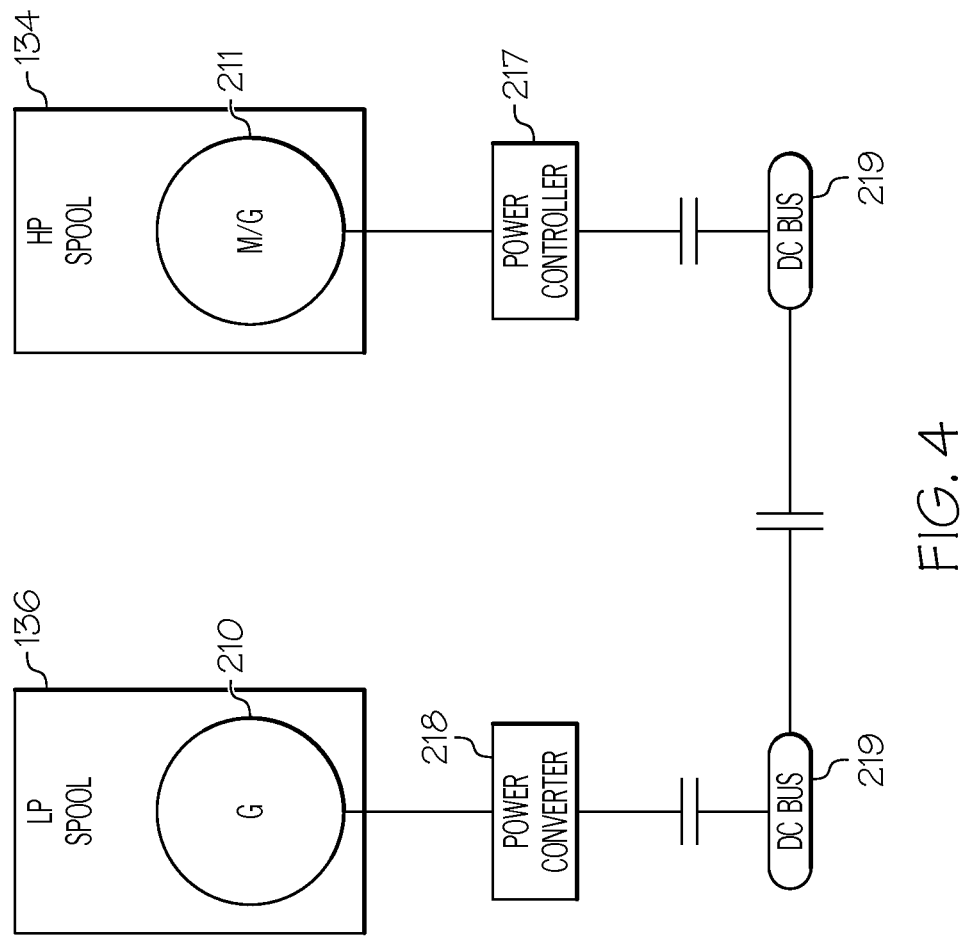

In yet another embodiment, referring now particularly to FIG. 4, a further alternative embodiment is illustrated wherein a AC electrical machine may be employed as the motor/generator 211. For example, a permanent magnet machine, an induction machine, or a switched reluctance machine would be suitable. In this embodiment, at the HP spool 134, the rectifier is eliminated the power controller is disposed directly between the motor/generator 211 and the aircraft's DC bus 219. At the LP spool 136, a power converter 218 may be employed to convert AC power from the generator 210 prior to supplying such power to the aircraft's DC bus 219. Further, the power controller 217 is a bi-directional power controller, not a uni-directional power controller as in FIGS. 2 and 3. As such, the bi-directional power controller 217 functions to direct power to or from the second electrical machine, depending on the mode of operation. In other respects, the control system illustrated in FIG. 4 operates in a manner analogous to the control system described above with regard to FIG. 2.

Figure 5:
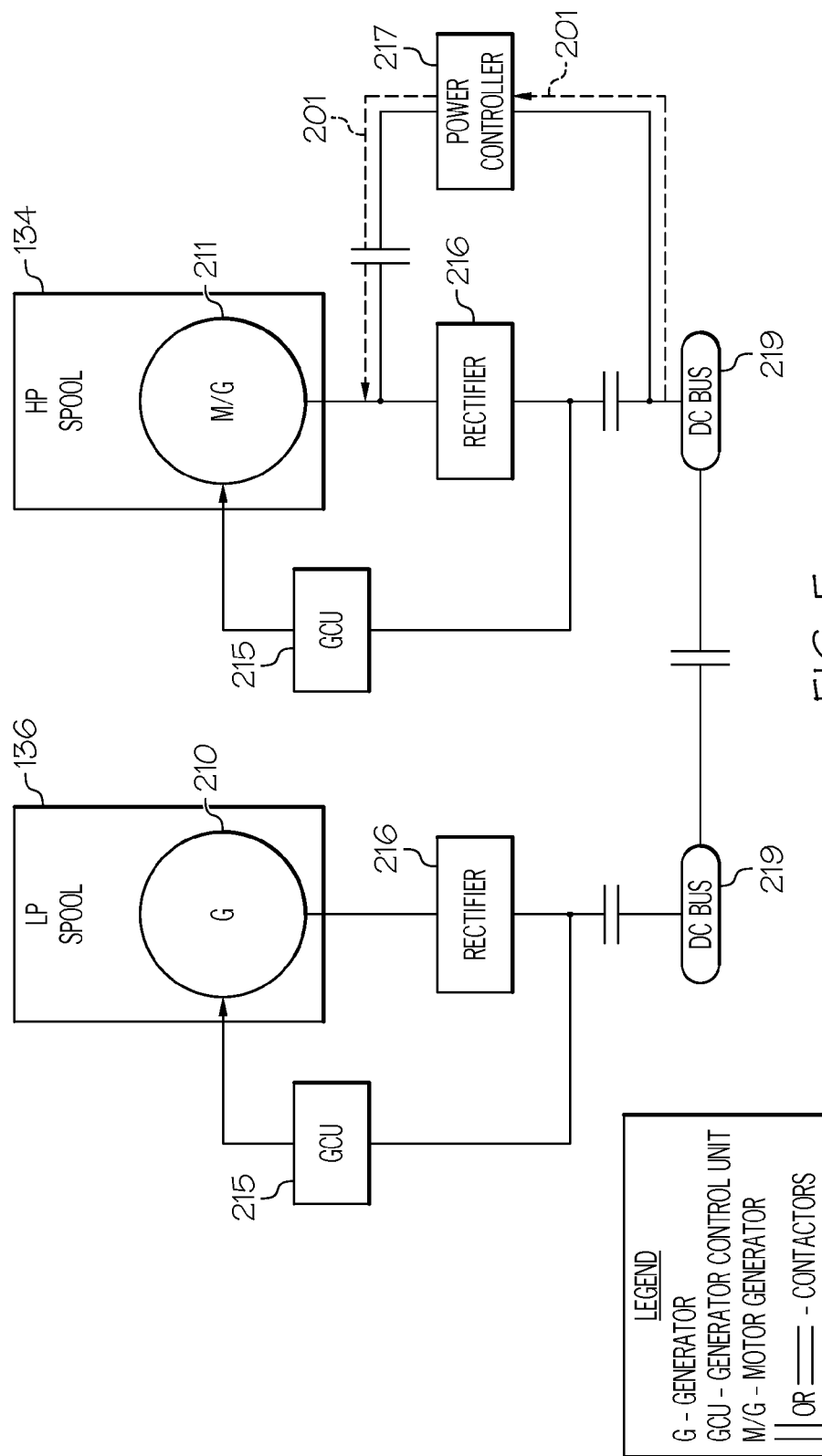
Figure 6:
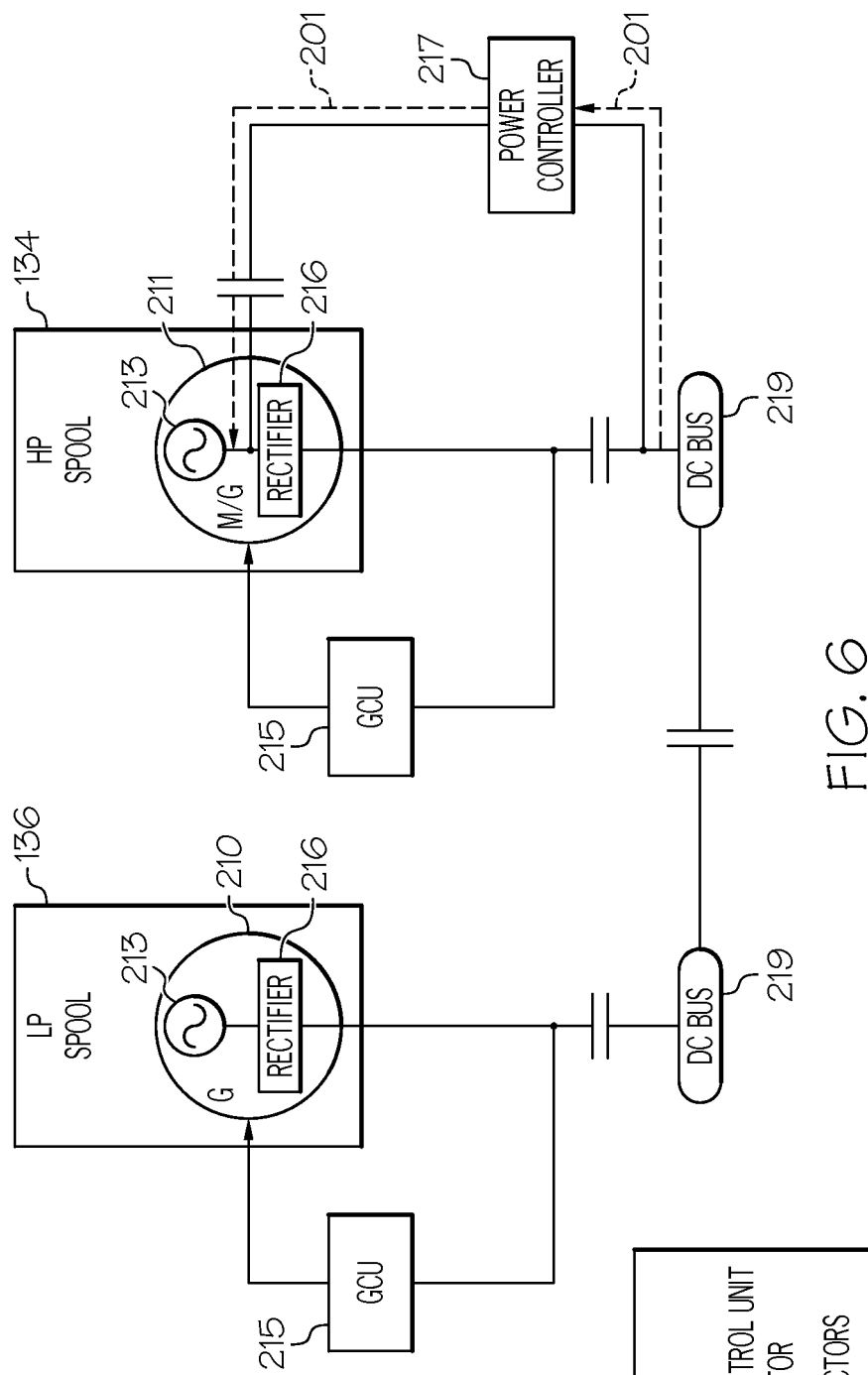
Figure 7:
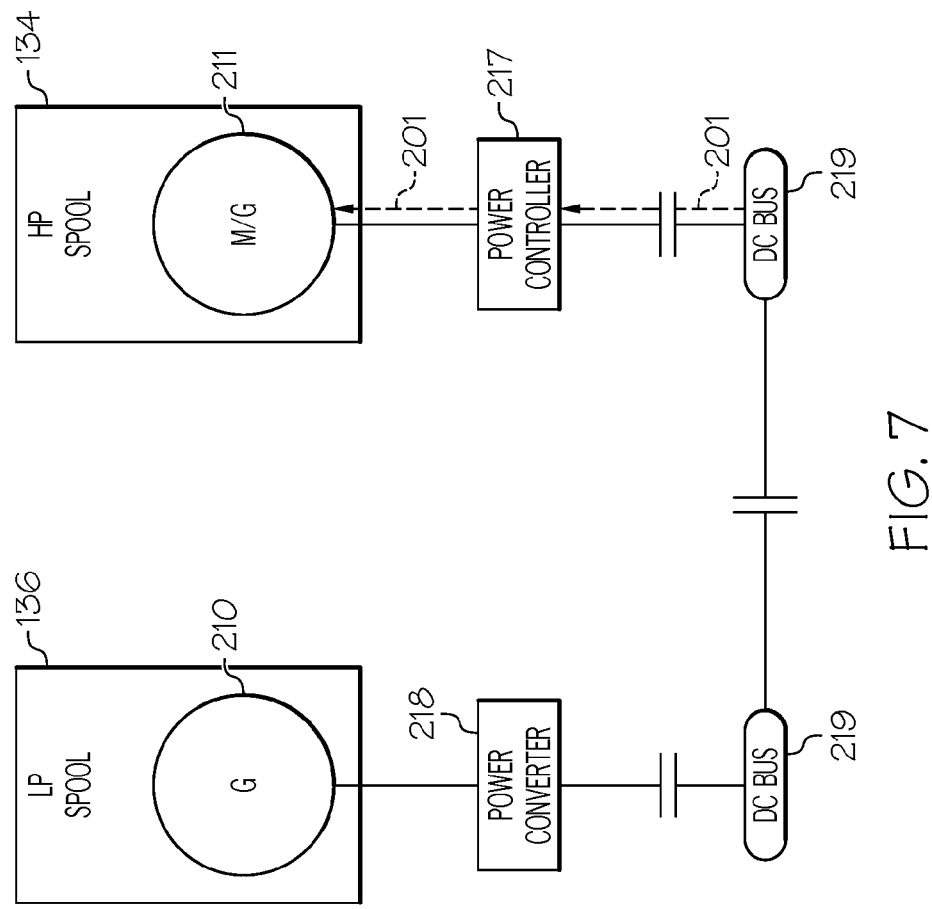

FIGS. 5, 6, and 7 illustrate the transfer of power in the control system according to mode 1, starter operations, in each of the three embodiments set forth above with regard to FIGS. 2, 3, and 4, respectively. Power flow is illustrated by dashed arrows 201. As shown in FIGS. 5, 6, and 7, following arrows 201, DC power is supplied from the aircraft's DC bus 219, wherein it is directed by uni-directional (FIGS. 5 and 6)/bi-directional (FIG. 7) power controller 217 to the motor/generator 211. The motor/generator 211 produces torque to start the engine.

Figure 8:
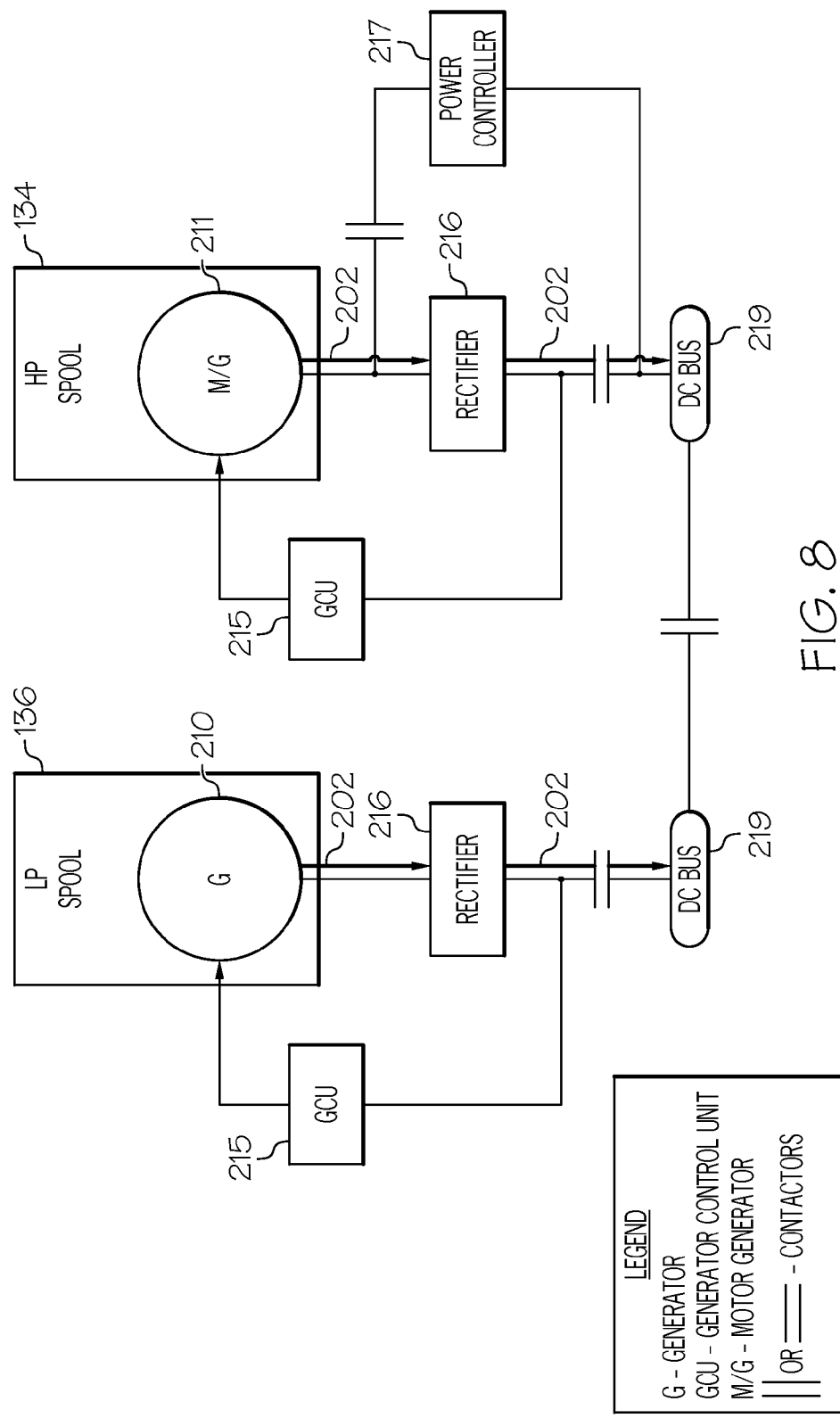
Figure 9:
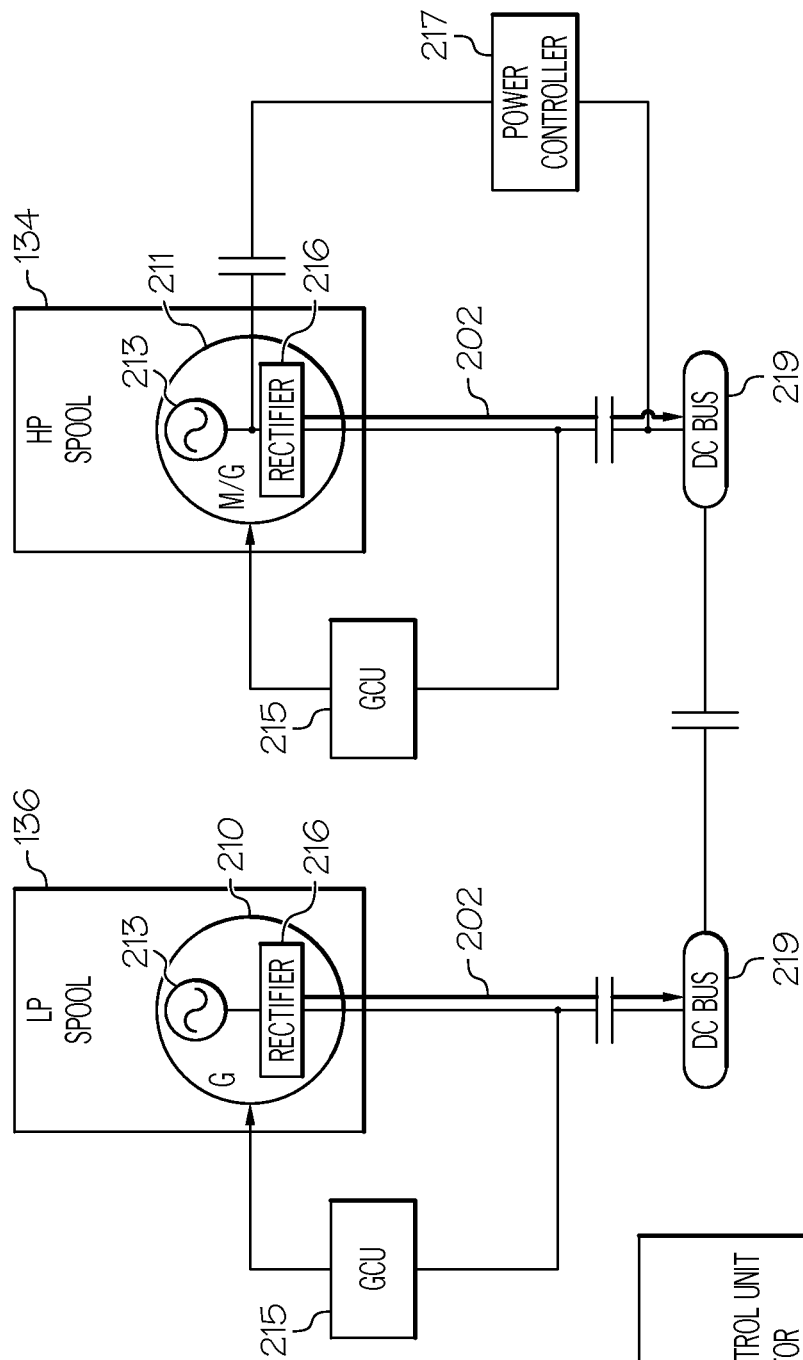
Figure 10:
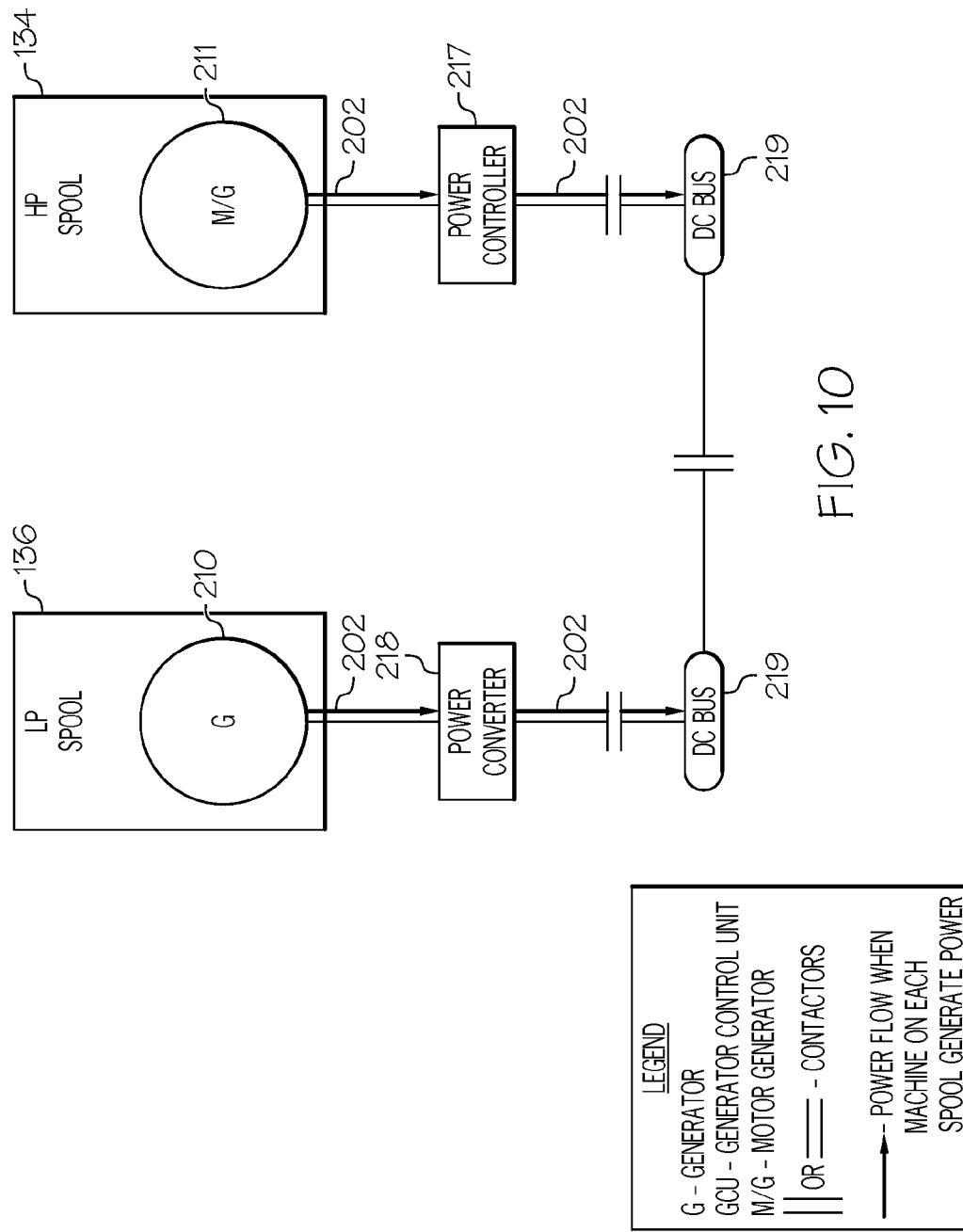

FIGS. 8, 9, and 10 illustrate the transfer of power in the control system according to mode 2, generator operations, in each of the three embodiments set forth above with regard to FIGS. 2, 3, and 4, respectively. Power flow is illustrated by solid arrows 202. As shown in FIGS. 8 and 9, following arrows 202, AC power is generated from both the generator 210 associated with the LP spool 136 when the LP spool 136 rotates and the motor/generator 211 associated with the HP spool 134 when the HP spool 134 rotates. The generated AC power is directed to the respective rectifiers 216, wherein the AC power is converted to DC power. Thereafter, the DC power out of each rectifier 216 is directed to the aircraft's DC bus 219, for powering electrical components of the aircraft. As shown in FIG. 10, following arrows 202, AC power is generated from the generator 210 associated with the LP spool 136 when the LP spool 136 rotates and from the motor/generator 211. The generated AC power is directed to the power converter 218 (from the LP spool) and to the bi-directional power controller 217 (from the HP spool), wherein the AC power is converted to DC power. Thereafter, the DC power is directed to the aircraft's DC bus 219.

Figure 11:
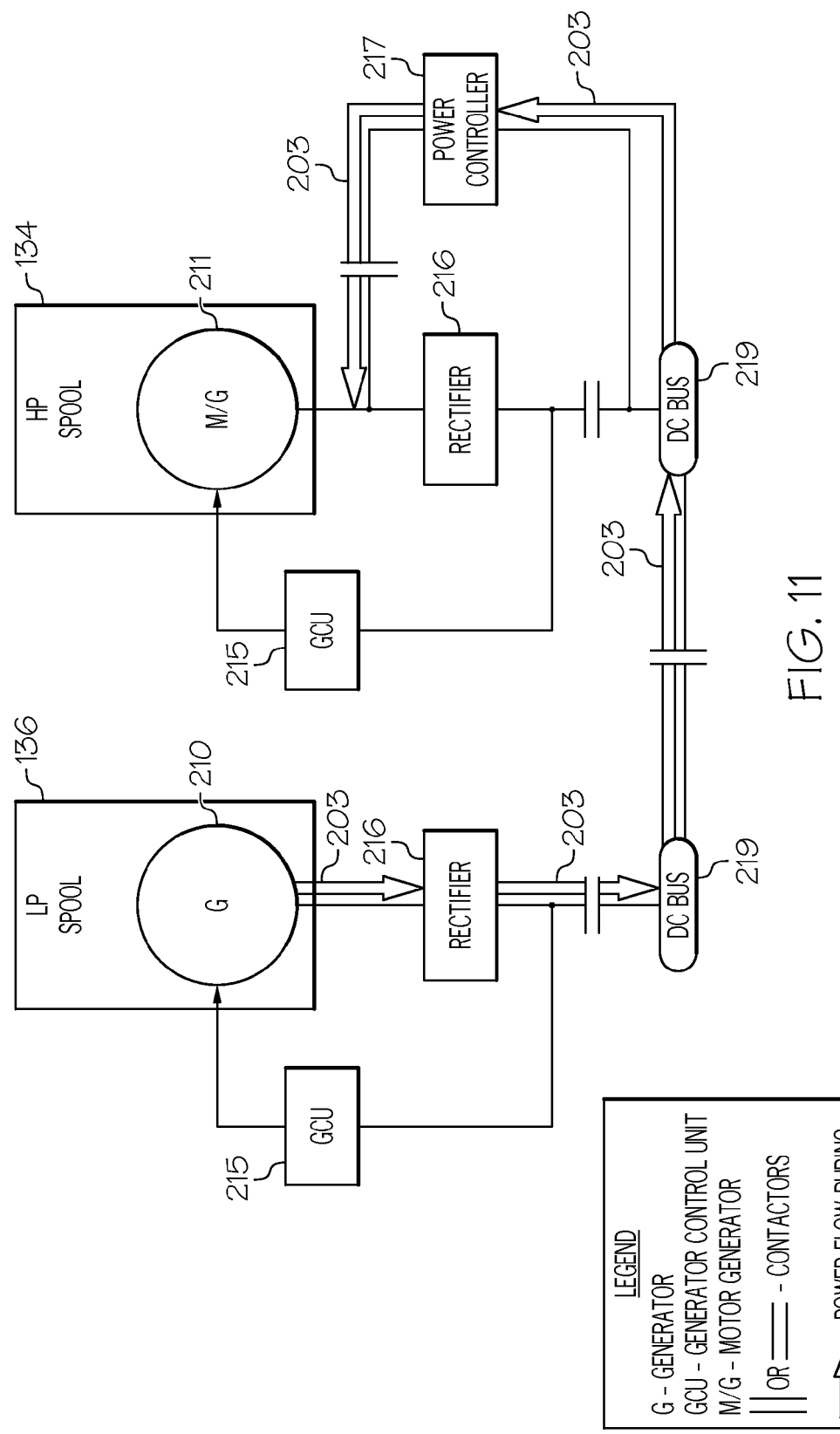
Figure 12:
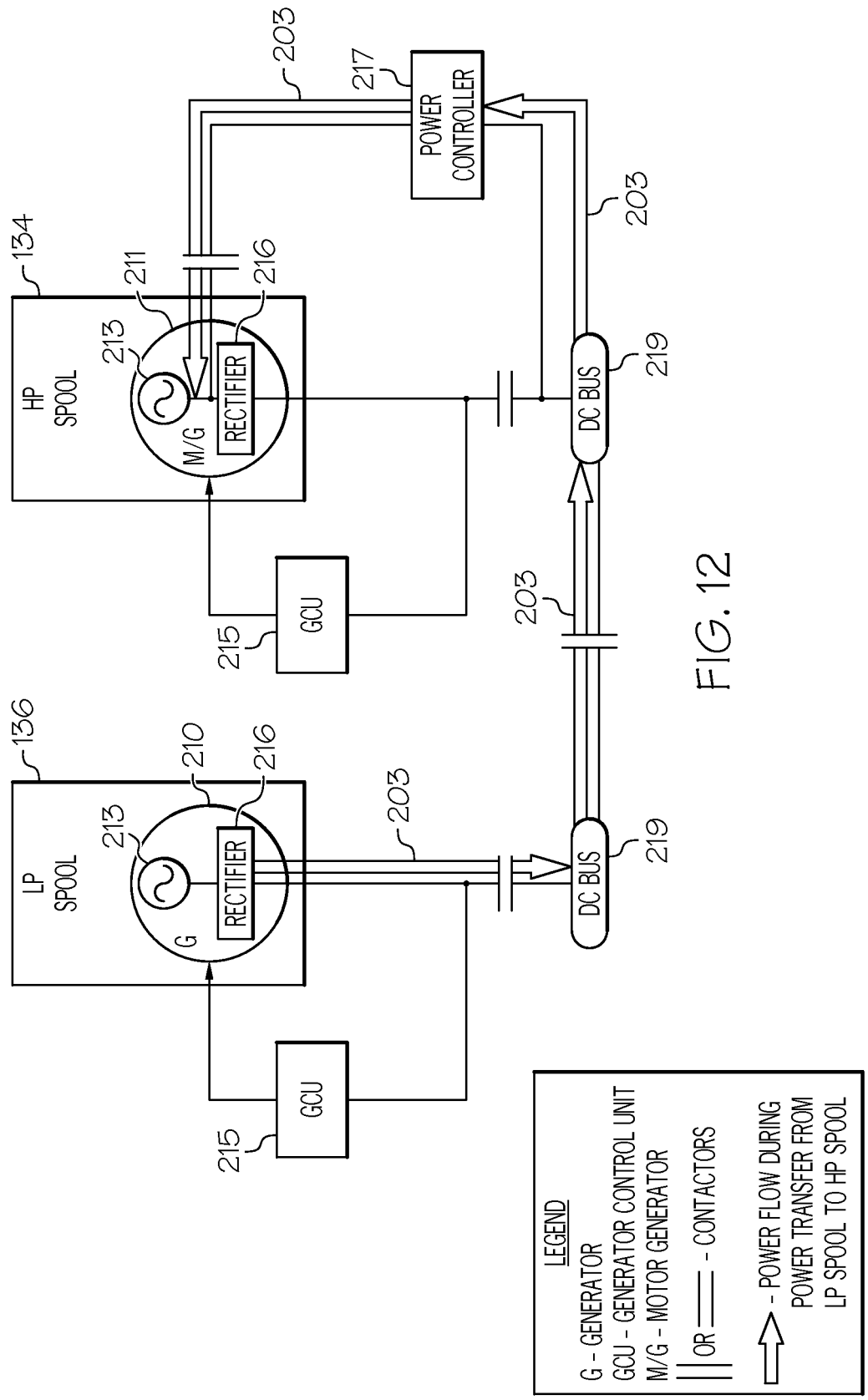

FIGS. 11, 12, and 13 illustrate the transfer of power in the control system according to mode 3, motor operations, in each of the three embodiments set forth above with regard to FIGS. 2, 3, and 4, respectively. Power flow is illustrated by double arrows 203. As shown in FIGS. 11 and 12, following arrows 203, AC power is generated from the generator 210 associated with the LP spool 136 when the LP spool 136 rotates. The generated AC power is directed to the rectifier 216, wherein the AC power is converted to DC power. Thereafter, the DC power is directed to the aircraft's DC bus 219. The aircraft's DC bus supplied DC power to the uni-directional power controller 217. The uni-directional power controller 217 supplies DC power to the motor/generator 211, and the motor/generator 211 produces torque that is added to the torque produced by the HP spool 134. As shown in FIG. 13, following arrows 203, AC power is generated from the generator 210 associated with the LP spool 136 when the LP spool 136 rotates. The generated AC power is directed to the power converter 218, wherein the AC power is converted to DC power. Thereafter, the DC power is directed to the aircraft's DC bus 219. The aircraft's DC bus supplied DC power to the bi-directional controller 217. The bi-directional power controller 217 supplies DC power to the motor/generator 211, and the motor/generator 211 produces torque that is added to the torque produced by the HP spool 134.

Whether the exemplary power transfer control systems are operated in the starter, generator, or motor modes is determined by an engine control system associated with the power transfer control system. Further, the engine control system controls the overall operation of the engine. The engine control system, or more simply "engine control," as is generally known, is used to control the output power of the engine by, for example, controlling fuel flow rate to the engine. In the depicted embodiment, the engine control receives a throttle position signal from an engine throttle, and signals from a plurality of sensors that are disposed at various locations on and within the engine. The sensors are used to sense various operational parameters associated with the engine such as, for example, various temperatures, speeds, and air flow, and supply signals representative of the sensed parameters to the engine control. The engine control processes the signals received from the engine throttle and the sensors and, among other things, supplies various commands to the engine to control its operation. It will be appreciated that the engine control may be any one of numerous types of engine controllers such as, for example, an FADEC (Full Authority Digital Engine Controller). As will now be described, the engine control also controls the operational mode of the power transfer control system (FIGS. 2-13) during operation of the engine.

As noted above, during some aircraft operations, the engine operation configuration may be sub-optimal, thereby consuming fuel in a less-efficient manner. Thus, during operation of the engine, the engine control is additionally configured to selectively command the power transfer control system to switch operational modes to increase the efficiency of engine operations. That is, to selectively switch the power transfer control system from operating in the generate mode to operating in the motor mode. (Further, during engine start operations, the engine control can cause the power transfer control system to operate in starter mode). As a result, instead of receiving mechanical power from the engine, and converting the mechanical power to electrical power, the motor/generator on the HP spool will receive electrical power from the generator on the LP spool, and convert the electrical power to mechanical output power and supply the mechanical output power to the engine via the HP spool.

The engine control will, more specifically, be configured to determine when the engine is not delivering the commanded thrust or power or otherwise operating sub-optimally. The engine control is additionally configured, upon making this determination, to supply a command to the power controller to switch the operational mode of the motor/generator. Because, as was noted above, the motor/generator is coupled to the high pressure spool, the mechanical output power supplied from the motor/generator to the engine is sufficient to reduce the decrease, or at least substantially reduce the decrease, of the engine speed, thrust, or power. When the mechanical power from the motor/generator is no longer needed, the engine control will supply a command to the power controller to switch the operational mode of the motor/generator back to the generate mode.

The engine control may be configured to determine when the engine is not delivering the commanded thrust or power or otherwise operating sub-optimally using any one of numerous techniques. For example, the engine control may be configured to make this determination based on one or more of the sensed operational parameters of the engine, such as engine speed. With this implementation, if the sensed rotational speed is less than a predetermined value, or is decreasing at too great of a rate, then the power controller is commanded to switch the operational mode of the motor/generator to the motor mode.

In another embodiment, the engine control may be configured to implement anticipatory logic. With this embodiment, the engine control may be configured to sense the position, or rate of change of position, of the engine throttle and, based on the sensed position (or rate of change of position) and one or more of the sensed operational parameters, anticipatorily determine if the engine will experience a sub-optimal configuration. If the anticipatory logic determines that the engine will experience a sub-optimal configuration, the engine control will then command the motor/generator control to switch the operational mode of the motor/generator.

In some implementations, the engine may not experience a drop or decrease in speed during some transients. In these implementations, however, the engine control may still command the motor/generator control to selectively switch the operational mode of the motor/generator. For example, during a transient maneuver the engine control may command the power controller to switch the operational mode of the motor/generator from the generate mode to the motor mode in order to improve the acceleration time of the engine, or otherwise improve the operational configuration of the engine.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of increasing the operational efficiency of an operating gas turbine engine, comprising the steps of:
    supplying mechanical power from a first spool of the operating gas turbine engine to a first electrical machine to thereby generate electrical power using the first electrical machine;
    supplying mechanical power from a second spool of the operating gas turbine engine to a second electrical machine to thereby generate electrical power using the second electrical machine;
    sensing one or more operational parameters of the operating gas turbine engine; and
    based on the one or more sensed operational parameters, ceasing to generate electrical power using the second electrical machine, and instead supplying at least a part of the electrical power generated by the first electrical machine to the second electrical machine to thereby generate and supply mechanical output power to the second spool of the operating gas turbine engine.

2. The method of claim 1, wherein the first electrical machine is a generator.

3. The method of claim 1, wherein the second electrical machine is a motor/generator.

4. The method of claim 1, wherein the first spool is a low pressure spool.

5. The method of claim 1, wherein the second spool is a high pressure spool.

6. The method of claim 1, wherein the first electrical machine generates AC electrical power, and wherein the method further comprises converting the AC electrical power to DC electrical power.

7. The method of claim 1, wherein the second electrical machine generates AC electrical power, and wherein the method further comprises converting the AC electrical power to DC electrical power.

8. The method of claim 1, wherein the at least a part of the electrical power generated by the first electrical machine is transferred via a DC bus from the first electrical machine to the second electrical machine.

9. A system for increasing the operational efficiency of an operating gas turbine engine, comprising:
    a first electrical machine associated with a first spool of the operating gas turbine engine, wherein the first spool is configured to supply mechanical power to the first electrical machine to thereby generate electrical power;
    a second electrical machine associated with a second spool of the operating gas turbine engine; and
    a power controller associated with the second electrical machine,
    wherein the power controller is configured to selectively change the configuration of the second electrical machine from a first configuration to a second configuration, wherein in the first configuration the second electrical machine is configured to receive mechanical power from the second spool to thereby generate electrical power, and wherein in the second configuration the second electrical machine is configured to generate and supply mechanical output power to the second spool, and
    wherein in the second configuration, at least a part of the electrical power generated by the first electrical machine is transferred to the second electrical machine to generate and supply mechanical output power to the second spool.

10. The system of claim 9, wherein the power controller is configured to selectively change the configuration based on one or more sensed operational parameters of the operating gas turbine engine.

11. The system of claim 9, wherein the first electrical machine is a generator.

12. The system of claim 9, wherein the second electrical machine is a motor/generator.

13. The system of claim 9, wherein the first spool is a low pressure spool.

14. The system of claim 9, wherein the second spool is a high pressure spool.

15. The system of claim 9, wherein the first electrical machine generates AC electrical power, and wherein the system further comprises a rectifier for converting the AC electrical power to DC electrical power.

16. The system of claim 9, wherein the second electrical machine generates AC electrical power, and wherein the system further comprises a rectifier for converting the AC electrical power to DC electrical power.

17. The system of claim 9, wherein the at least a part of the electrical power generated by the first electrical machine is transferred via a DC bus from the first electrical machine to the second electrical machine.

18. The system of claim 9, wherein the second electrical machine is further configured to operate as a starter.

* * * * *